March 3, 1953 — L. BROCK — 2,630,244
CONTAINER AND HANDLE THEREFOR
Original Filed Jan. 21, 1946
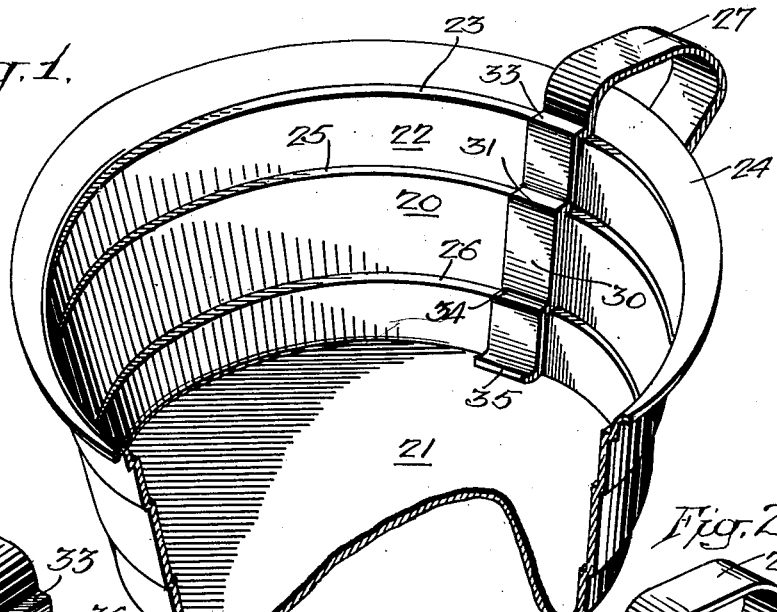
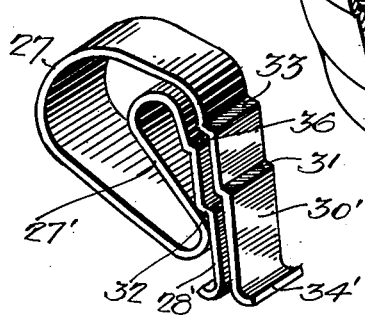
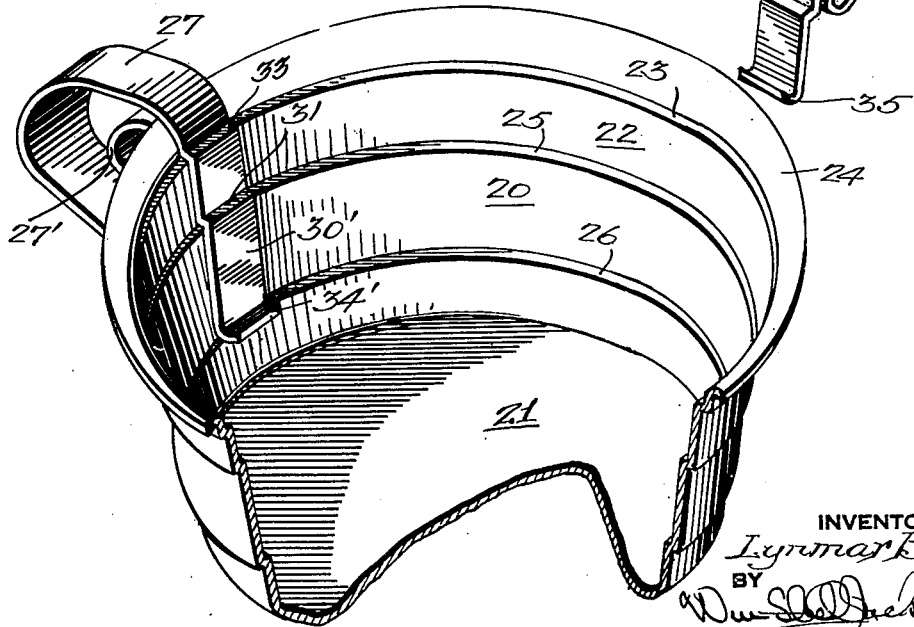
INVENTOR
Lymar Brock
BY
ATTORNEYS Patented Mar. 3, 1953

2,630,244

UNITED STATES PATENT OFFICE 2,630,244

CONTAINER AND HANDLE THEREFOR

Lynmar Brock, Philadelphia, Pa.

Application March 24, 1947, Serial No. 736,860, which is a division of application Serial No. 642,455, January 21, 1946. Divided and this application June 18, 1949, Serial No. 99,920

3 Claims. (Cl. 220—94)

The present invention relates to containers for handling food and to handles therefor.

A purpose of the invention is to provide a food container with one or more angular joggles in the side wall and to engage a resilient handle against the inside and outside of the side wall and lock the handle in place in the joggle or joggles.

A further purpose is to employ a resilient handle for a reverse bend loop and having arms adapted to engage inside and outside the wall of a food container, and locking bends on the arms of the handle which engage in the joggles.

A further purpose is to bend a strip of resilient material such as metal into a loop having spaced arms at the ends of the loop, and to provide steps in the arms which cooperate to engage the inside and outside of a joggle or joggles on a container.

A further purpose is to extend the arms at the ends of the loop in the same direction or in opposite directions as desired.

Further purposes appear in the specification and in the claims.

Figure 1 is a fragmentary perspective view of a container showing one form of handle in place thereon.

Figure 2 is an isolated perspective of the handle shown in Figure 1.

Figure 3 is a fragmentary perspective view of a container showing the variation in the form of a handle in place in the container.

Figure 4 is an isolated perspective of the handle of Figure 3.

In the drawings like numerals refer to like parts.

Describing in illustration but not in limitation and referring to the drawings,

The present application is a division of my application Serial No. 736,860, filed March 24, 1947 for Food Platter, which in turn is divided from my application Serial No. 642,455, filed January 21, 1946 for Process and Apparatus for Preparing and Dispensing Food and now abandoned.

In many circumstances, especially in providing industrial lunches, it is desirable to employ food containers which can be packed in a minimum of space, and yet will provide a maximum of convenience at the point of use.

The food containers of the present invention are suitable particularly for liquids, such as beverages of the character of coffee and tea, soups, and desserts, such as custards, ice cream and the like.

It will be evident that the goods containers themselves can be nested and transported to the point of use in nested condition and yet a very firm engagement with the handle can be provided by simply snapping a resilient handle in place. Thus for the purpose of transporting, the container has all the advantages of a handleless container, and it has the advantages of the handleless container for the purpose of washing, but during use it conveniently is provided with a very effective handle. The handle not only is firmly held, but is free from tendency to rock or shift position during use.

In Figures 1 and 3 I illustrate a cup or container 20 for liquid such as soup or coffee, having a bottom 21, an annular side wall 22 and a recess 23 near the top and below the rim 24 to receive a cover not shown, of the type which forms the subject matter of my application Serial No. 736,860, incorporated herein by reference. This container likewise may be of any suitable metal of which aluminum alloy has proved to be very satisfactory.

In the side wall I provide an annular joggle 25 and preferably a second annular joggle 26 spaced somewhat below the joggle 25. The joggles are in effect annular steps or flanges in the side wall.

A very convenient and satisfactory form of handle is illustrated in Figure 2. This handle is not in place during the period when the container is transported to the point of use, but is applied after the cover is removed (if the container is covered) and otherwise preferably at the point of use. It consists of a suitable strip material such as stainless steel or aluminum cold worked to provide adequate spring properties. The strip is bent to provide a reverse loop 27 intended to be grasped by the hand as a handle, an arm 28 to engage the outside of the wall of the container and an arm 30 to engage the inside of the wall of the container. The arms are normally spring urged toward one another, and when separated by the wall of the container, they tend to grasp it.

The inner arm 30 has a shoulder 31 cooperating with a shoulder 32 on the outer arm 28, the two shoulders being adapted to engage and lock the handle in position on either side of the joggle 25. To provide additional security against canting, I provide on the inner arm a shoulder 33 to engage the cover recess 23, which in this case functions as a joggle, a shoulder 34 to engage a joggle 26 and an end flange 35 to engage the bottom 21.

The handle is slipped on by placing the inner arm on the inside of the container and spreading the reverse bend 27 so that the outer arm 28 can pass over the rim, after which the inner and outer arms can be forced downwardly until the handle assumes the position shown in Figure 1. To remove the handle it is merely necessary to force the outer arm outwardly to allow the shoulder 32 to escape from the joggle 25, and to allow the outer arm to pass over the rim, and then pull downwardly on the handle.

An alternate form of handle application is shown in Figure 3, where the resilient strip material has a reverse bend 27' on the bend 27, an inner arm 30' and an outer arm 28'. Unlike the forms of Figures 1 and 2, where the inner and outer arms extend in opposite directions, the two arms in Figures 3 and 4 extend in the same direction due to the bend 27'. The inner arm in this case is provided with a shoulder 31 adapted to engage the joggle 25 and a shoulder 33 and a prong 34' adapted to engage respectively the recess 23 and the joggle 26. The outer arm is spring urged towards the inner arm due to the resilience of the material in this form as in the other form. In the outer arm 28' a shoulder 32 cooperates with the shoulder 31 on the inner arm to engage the joggle 25, and a shoulder 36 cooperates with the shoulder 33 on the inner arm to engage the recess 23.

In the handle of Figures 3 and 4 there is no extension to the bottom wall of the container, whereas in Figures 1 and 2 the prong 35 engages the bottom wall.

The operation of the form of Figures 3 and 4 is similar to that of Figures 1 and 2 except that insertion and removal of the handle is facilitated by the reverse bend 27', into which a finger can be extended to separate the inner and outer arms and facilitate application of the handle to the container or the removal of the handle from the container.

In view of my invention and disclosure variations and modifications to meet individual whim or particular need will doubtless become evident to others skilled in the art, to obtain all or part of the benefits of my invention without copying the structure shown, and I therefore, claim all such insofar as they fall within the reasonable spirit and scope of my claims.

Having thus described my invention what I claim as new and desire to secure by Letters Patent is:

1. A container of cup formation having a side wall arranged in steps with a joggle at an interconnecting shoulder portion of each of a plurality of steps and wall portions between the joggles of successively larger diameters, in combination with a resilient integral band handle having a loop outside the container for engagement by the hand of the user, having a prong extending inside the container provided with a plurality of steps corresponding to the joggles, and having shoulder portions engaging in a plurality of joggles inside the container and having interconnecting portions engaging a plurality of the wall portions of different diameter inside the container, and also having a prong engaging the outside of the container, pressing against one of the wall portions intermediate between the joggles and pressing against the shoulder portion at one of the joggles which is also engaged by the prong inside the container.

2. A container according to claim 1, in which the prong outside the container extends oppositely from the prong inside the container.

3. A container according to claim 1, in which the prong outside the container engages in a plurality of joggles outside the container which are also engaged by the prong inside the container.

LYNMAR BROCK.

REFERENCES CITED

The following references are of record in the file of this patent:

UNITED STATES PATENTS

| Number | Name | Date |
|---|---|---|
| 629,082 | Law | July 18, 1899 |
| 650,949 | Phillips | June 5, 1900 |
| 894,725 | Cooper | July 28, 1908 |
| 1,133,420 | Young | Mar. 30, 1915 |
| 1,627,880 | Baxter | May 10, 1927 |
| 1,848,649 | Oehler | Mar. 8, 1932 |
| 2,073,475 | Gordon | Mar. 9, 1937 |

FOREIGN PATENTS

| Number | Country | Date |
|---|---|---|
| 134,201 | Austria | July 25, 1933 |
| 576,274 | France | May 9, 1924 |